United States Patent [19]
Marsan

[11] 3,805,789
[45] Apr. 23, 1974

[54] HERMETICALLY SEALED SEALING MEANS AND APPLIANCE FOR OSTOMY CONDITIONS

[76] Inventor: Arthur Edward Marsan, 6700 Escondido Dr., El Paso, Tex. 79912

[22] Filed: Nov. 26, 1971

[21] Appl. No.: 202,179

[52] U.S. Cl. .............................................. 128/283
[51] Int. Cl. .............................................. A61f 5/44
[58] Field of Search .................................. 128/283

[56] References Cited
UNITED STATES PATENTS

| | | | |
|---|---|---|---|
| 3,077,192 | 2/1963 | Berger | 128/283 |
| 3,373,745 | 3/1968 | Benfield et al. | 128/283 |
| 3,612,053 | 10/1971 | Pratt | 128/283 |
| 3,667,469 | 6/1972 | Marsan | 128/283 |
| 3,022,786 | 2/1962 | Nalon | 128/283 |

FOREIGN PATENTS OR APPLICATIONS

| | | | |
|---|---|---|---|
| 1,159,916 | 7/1969 | Great Britain | 128/283 |

OTHER PUBLICATIONS

Perma–Type Co. Circular and Price List Effective 2-71.

Primary Examiner—Charles F. Rosenbaum

[57] ABSTRACT

An ostomy seal having a sealing material hermetically sealed in a receptacle that can be applied around a stoma without removing the sealing material from the receptacle. In the preferred embodiment the receptacle is in the form of a mold consisting of a ring body forming the outer periphery of the mold and thin film sheets on opposite sides of the ring body totally enclosing the sealing material therein. The sealing material such as a gelatinous material is hermetically sealed in the mold. The mold with its sealing material is sold as a unitary article or as part of a complete drainage pouch assembly. The mold can be applied to almost any drainage pouch. When the mold is applied to a patient the gel makes sealing contact entirely around the stoma. A given size mold serves the needs of a wide range of stoma sizes and shapes because the fullness of the gel contained within the mold causes the gel to seal entirely around any of different stoma sizes and shapes. The mold serves as a retainer ring for holding the gel in position and also for attachment of a belt which encircles the patient's waist and holds the appliance on the patient. Low cost of manufacture makes it economical to dispose of the entire appliance after a single use.

9 Claims, 23 Drawing Figures

PATENTED APR 23 1974

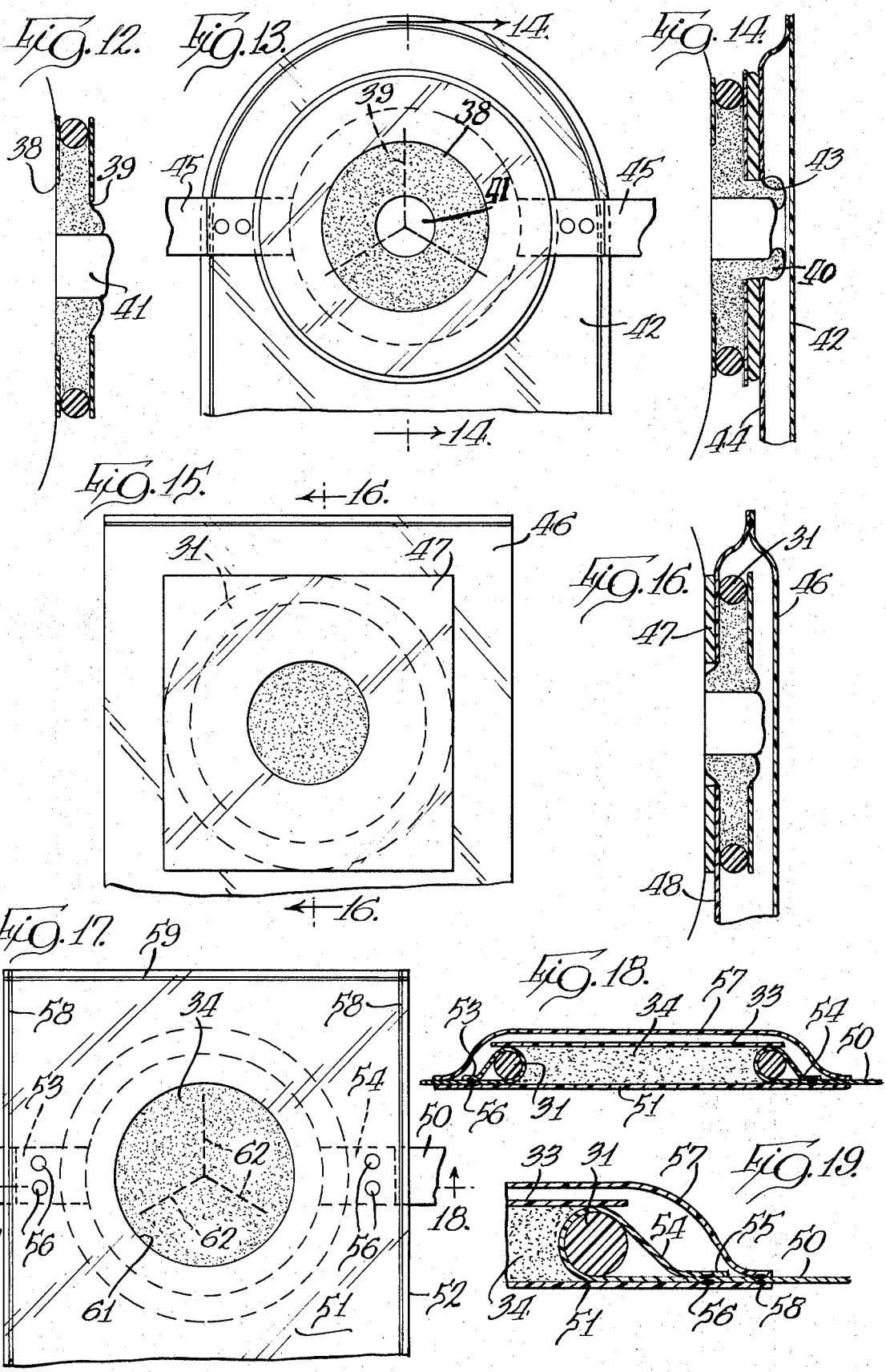

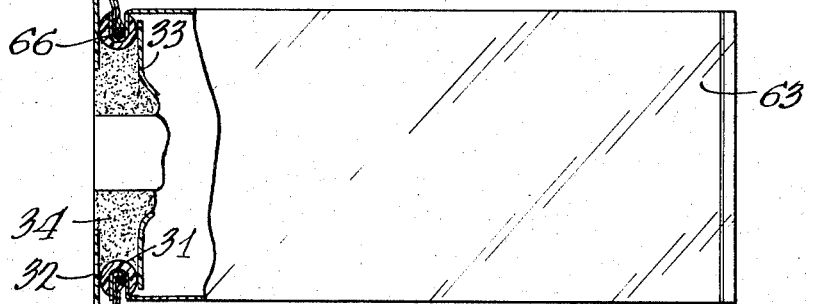
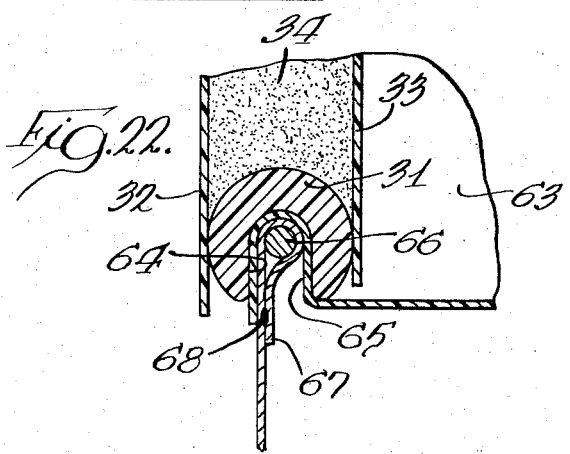
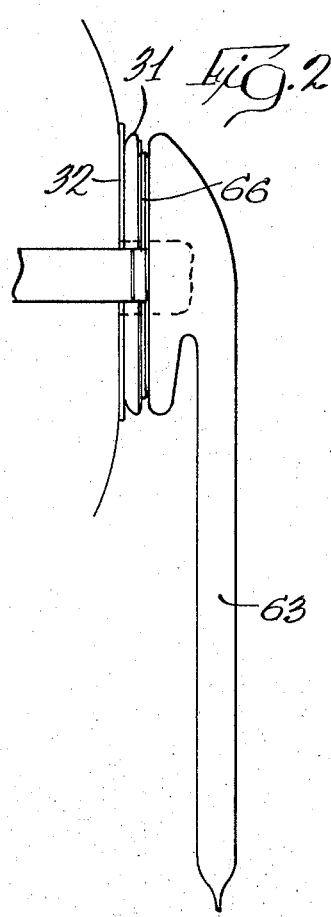
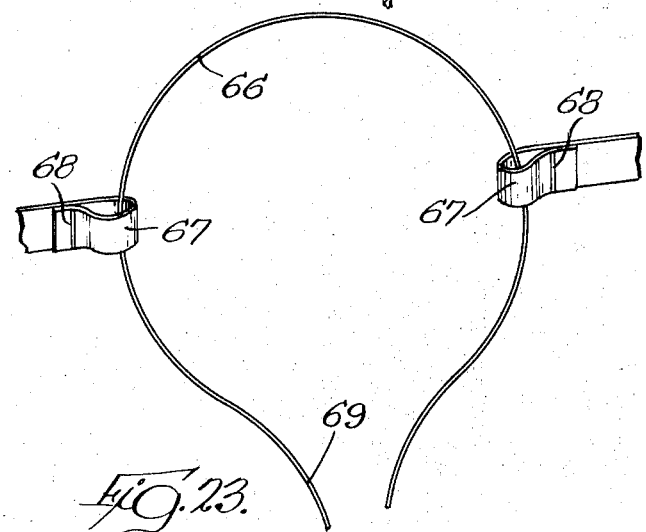

HERMETICALLY SEALED SEALING MEANS AND APPLIANCE FOR OSTOMY CONDITIONS

This invention relates to fecal receptors in the art of surgery and has more particular reference to appliances adapted for application to what is known as ostomy conditions, that is, colostomy, ileostomy, and the like. Here it is customary to provide drainage pouches for receiving the fecal discharge from the stoma of a patient. Such pouches are usually applied to the patient's abdomen in position for the stoma to discharge or drain into the pouch. This presents serious problems, mainly that of providing a satisfactory seal between the skin around the stoma and the pouch. This problem is intensified by the fact that this art has advanced to the point where ostomy patients have the desire to perform practically all normal activities such as walking, running, and even athletics to a degree, while still wearing such drainage appliances. However, the appliances and equipment available for such purposes are not altogether satisfactory, particularly because leakage of the fecal discharge frequently reaches the patient's skin. This causes no end of troubles. It has been the general practice to use karaya gel rings as a sealing means between the drainage pouch and the skin around the stoma, but such means are subject to many objections. Karaya rings have many inadequacies inherent to their properties, manner of use, and functioning under their known uses. The karaya gels are semi-solids or semi-liquids at normal room temperatures; they have a degree of flexibility and also a degree of elasticity; they will absorb water up to a point and still retain their general shape unless subjected to excessive pressures and strains; and among other things they can also exhibit some degree of cold flow. One method of making karaya gel seals is to cut them to ring shape from flat sheets of karaya in sizes from approximately 2 inches to 6 inches outside diameter and from one-half inch to 5 inches inside diameter. This large variety of sizes is due to the variations in the patient's requirements necessitated by the surgical technique employed by the surgeon. Another method of making these gel sealing rings is to pour the liquid mixture into a re-usable mold coated with a release agent and allow the mixture to solidify or gel. After the mixture has gelled, a cover of plastic film is placed over the gel. The gel seal is removed from the mold before it is applied to the patient. The objections to these methods of making, storing, and using such gel seals are many. Sanitation is poor, permitting contamination of the gel; the use of release agents involves excessive handling; cold flow of the gel results in distortion of the gel ring and failure to fit around the stoma; dry-out of the gel results in hard edges and waste because the seal is not usable; with the result that these defective seals are returned to the manufacturer; over stocking of the many sizes causes return of seals for credit; since the fingers must be used to grip and apply the seals, the gel rings are apt to be stretched and distorted, particularly if the gel is too soft and too tacky, with the result that the distorted gel ring leaves too much skin exposed around the stoma and the patient's skin can be excoriated; as the kayara absorbs water it becomes softer and can ooze outward from the stoma and soil the patient's clothing or bedding and cause extreme embarrasment and discomfort; and many drainage pouches using karaya seals require costly components such as gaskets, ring flanges, and belts which must be washed, disinfected, and treated so as to remove stains and odors in order to be reused on the patient.

This invention aims, therefore, to overcome the objections and inadequacies of prior sealing means and appliances used in ostomy conditions.

My invention contemplates, broadly, the provision of a novel sealing means characterized by a receptacle or container for holding a body of skin sealing material that can be applied around a stoma without removing the sealing material from the receptacle or container.

An object is to provide an ostomy sealing means having the sealing material hermetically sealed in a receptacle until the receptacle is applied to the stoma of a patient. The receptacle serves as a container having the function of holding said material in sealing position on the patient.

Another object is to provide a sealing means in which the skin sealing material such as a gel is contained in a receptacle preferably in the form of a ring mold with the gel hermetically sealed therein and thereby protected against unsanitary and objectionable conditions. With this construction the sealing means will be used on the patient without removing the gel from the mold or touching the gel with the fingers.

Another object is to provide an improved gel mold which will serve to support and retain the sealing gel in the area it is needed and in a manner to cause contact of the gel completely around the stoma and the adjacent area, whereby to obtain a more effective and satisfactory seal.

Another object is to provide a sealing means of the character described, which can be used with almost any drainage pouch now being made and marketed by the various manufacturers. The hermetically sealed gel mold of my invention is a unit adapted to be sold as such or for application to any known drainage pouch appliance as a component thereof.

Another object is to provide a sealing means in the form of a unit which of a given maximum diameter size will be adapted to take care of many smaller stoma sizes and, therefore, will supplant the need for selling many different size sealing rings.

Another object is to provide a sealing means for ostomy conditions in which a semi-liquid sealing material such as soft gel is contained within a receptacle around a stoma and held from oozing outwardly beyond the structure of said receptacle but is permitted free egress through the stoma discharge side thereof.

Another object is to provide an improved sealing means characterized by a hermetically sealed gel mold adapted for using any of a wide range of sealing gels or mixtures adapted to be poured into the mold, as well as sealing materials in powdered form adapted to be gelled by the addition of a liquid before applying to a patient.

Another object is to eliminate the need for mold release agents now commonly used in this practice.

Another object is to provide a hermetically sealed gel mold which can be incorporated as an integral part of a totally disposable drainage pouch assembly; that is, the hermetically sealed mold is of such novel construction as to permit of manufacture at a low cost and, when embodied in a drainage pouch as a component thereof, the entire assembly is economical for disposal after a single use.

Other objects and attendant advantages will be appreciated by those skilled in this art as the invention becomes better understood by reference to the accompanying drawings when considered in connection with the specification and claims.

Referring to the drawings:

FIG. 8 shows the mold parts of FIG. 6 with a gel mixture filled in;

FIG. 12 is a sectional view showing a sealing unit of my invention in position on the abdomen of a patient with the stoma penetrating through the gel sealing material;

FIG. 13 shows a sealing unit of my invention applied to the outside of a conventional drainage pouch and showing the pouch and the sealing unit applied to the abdomen;

FIG. 14 is a sectional view taken on the section line 14—14 of FIG. 13;

FIG. 15 shows a sealing unit of my invention applied to the inside of a conventional drainage pouch;

FIG. 16 is a sectional view taken on the section line 16—16 of FIG. 15 showing the pouch and the sealing unit applied to the abdomen;

FIG. 17 shows a sealing unit of my invention applied to the inside of a drainage pouch, looking at the side of the pouch which is applied to the abdomen;

FIG. 18 is a sectional view taken on the section line 18—18 of FIG. 17;

FIG. 19 is an enlargement of the right hand portion of FIG. 18;

FIG. 20 illustrates adapting the sealing unit to the open end of a plastic drainage bag, and the application of a belt thereto, showing the bag extending horizontally from the abdomen;

FIG. 21 shows the FIG. 20 drainage pouch as it would hang normally from the patient;

FIG. 22 is an enlarged sectional view through a portion of the mold, bag and belt; and FIG. 23 shows belt ends attached to a wire twist member which is used in the embodiment FIG. 20.

Figure 9:
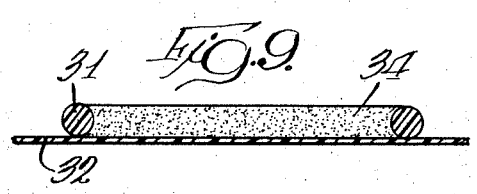
FIG. 9 is a sectional view taken on the section line 9—9 of FIG. 8.
Figure 10:
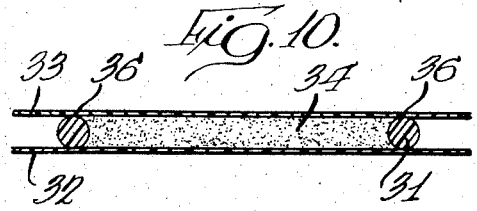
FIG. 10 is a section similar to FIG. 9 but with a second film sheet positioned on the ring member, with the top and bottom film sheets united as by heat sealing to the ring member, making a hermetically sealed skin sealing unit.
Figure 11:
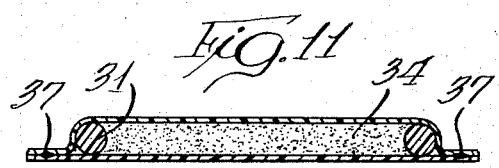
FIG. 11 is similar to FIG. 10 but shows a variation in heat sealing the film sheets to the ring member.

My invention contemplates in a preferred form a combined gel mold and retainer having a skin sealing material hermetically sealed therein constituting a unitary article. Many advantages result from the fact that the gel or other skin sealing material is confined in an air-tight unit from the time of manufacture of such unit until the time of its use on a patient. In this preferred embodiment the unit consists of parts, namely, a ring body 31, film sheets 32 and 33 applied to opposite sides of the ring body, and a sealing material 34 hermetically sealed within the mold unit. The bottom sheet 32 is united to the ring body 31 as by heat sealing or otherwise uniting at 35 entirely around said body. In some applications of the invention a film sheet forming a side wall of a drainage pouch bag may be substituted for the sheet 32 so that this bag sheet becomes a side of the mold, as described hereinafter. The sealing material 34, a gel mixture, is poured into the mold formed by the ring body and the bottom sheet 32 as shown in FIG. 9. The top film sheet is then heat sealed to the ring body at 36 as shown in FIG. 10, thus completely and hermetically sealing the mold unit. In FIG. 11 I have shown the peripheral margins of the sheets 32 and 33 heat sealed entirely around at 37. In this embodiment the sealing material 34 is a gel mixture poured into the mold as shown in FIG. 9. The resulting unit shown in FIG. 10 is a receptacle in which the gel is preserved in a sanitary condition and protected against all extraneous contacts and influences until it is to be used on a patient. Many objections to prior seals used with drainage pouches as indicated above, are overcome. Furthermore, the sealing unit of my invention may be sold to the trade for use with practically all makes of drainage pouches. Also, this sealing unit may be applied either outside or inside a pouch bag, as described more in detail hereinafter. And, by reason of the novelty of this sealing unit a given size unit will eliminate the need for a large stock of seals having specific sizes for the different sizes and shapes of stomas.

Figure 1:
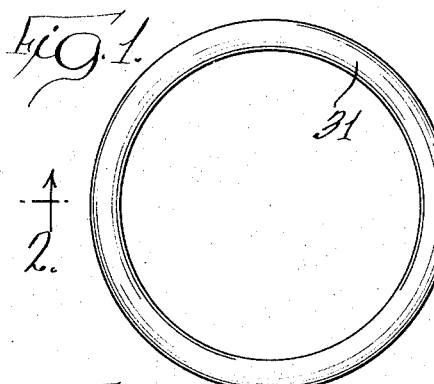
FIG. 1 is a top or face view of a ring member which forms the peripheral body of a mold unit, a feature of my invention.
Figure 2:
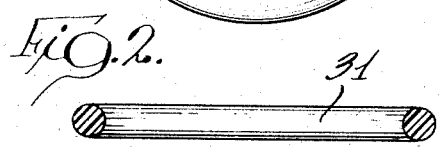
FIG. 2 is a sectional view taken on the section line 2—2 of FIG. 1.
Figure 3:
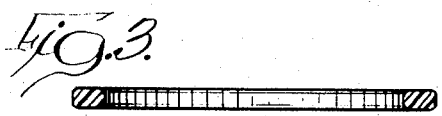
FIG. 3 is a similar section but with the cross-section of the ring rectangular instead of round.
Figure 4:
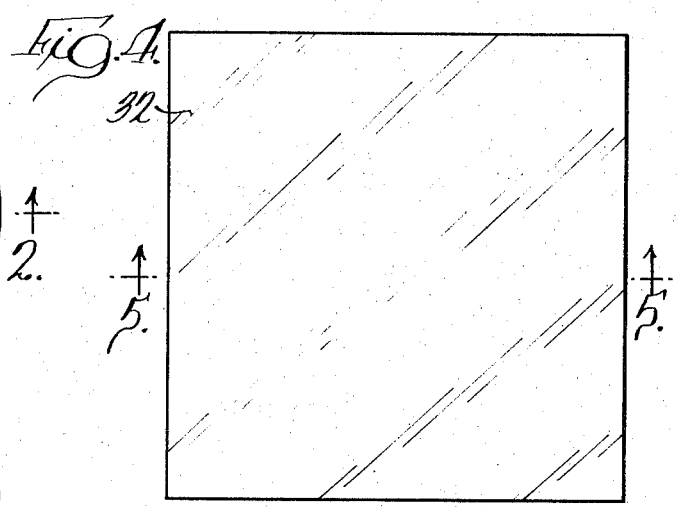
FIG. 4 shows a flat film sheet, one of which is applied to each side of the ring shown in FIG. 1.
Figure 5:
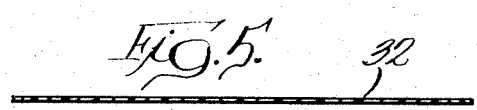
FIG. 5 is a sectional view taken on the section line 5—5 of FIG. 4.
Figure 6:
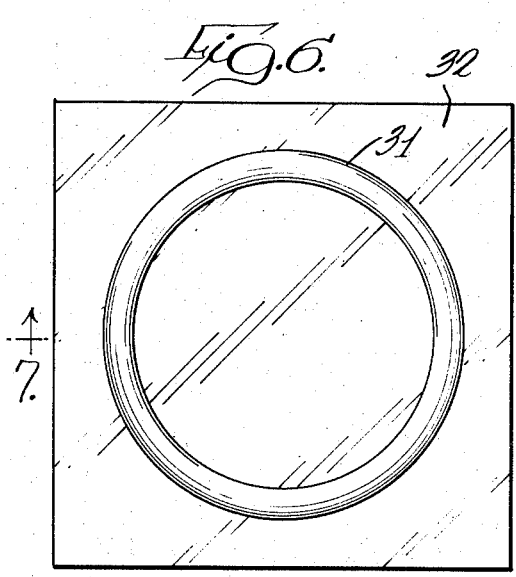
FIG. 6 shows the ring member of FIG. 1 position on the film sheet of FIG. 4.
Figure 8:
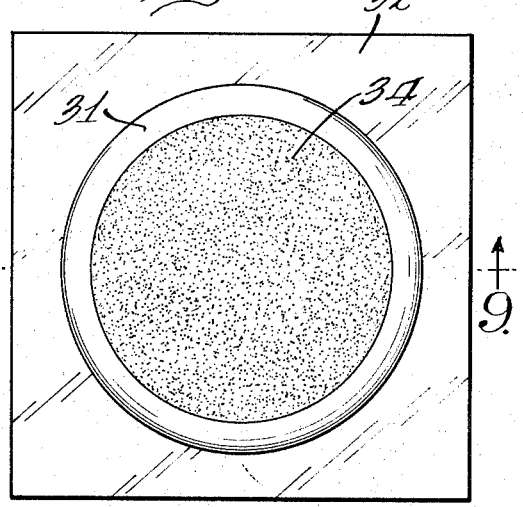
Figure 7:
FIG. 7 is a sectional view taken on the section line 7—7 of FIG. 6.

Referring more particularly to the preferred embodiment, the ring body may be of plastic, rubber, metal, wood, or any other material or composition having sufficient strength to retain its shape when in use on a patient without excessive distortion. The ring serves as the peripheral body of the mold. The ring is of sufficient maximum diameter to serve the needs of a wide range of stoma sizes and shapes, as will presently be apparent. The diameter and cross sectional shape of the ring may vary. FIG. 3 shows a rectangular cross section of the ring body instead of round, but this cross sectional shape may be varied and the ring body may be of multi parts. The sheets 32 and 33 may be of other material depending on that of the ring body and may be united to the ring body by adhesives, or cementing, or otherwise to hermetically seal the unit. The sealing material 34 is preferably a semi-fluid mixture adapted to be poured into the mold and which gels and retains its tacky, sealing, and somewhat fluid properties after the mold is closed and until time for using on the patient. In general, I prefer to use a sealing material of karaya or starch gel, gels of glycerine, oils, waxes, sterates, gums, synthetic resins, celluloses, etc. They can be water soluble or insoluble. Also, they can be in a dry form such as powders that can become gel seals with the addition of a solvent, or heat, or water. Where the sealing material includes karaya powder (which is of relatively high cost) my invention permits the use of smaller quantities of such powder and provides improved sealing functions. For example, by the use of a mold unit such as described, the mixture may contain less than one third karaya and a relatively large proportion of gylcerine. The gel will be of a softer consistency than karaya rings now commonly used in ostomy. Also, this softer gel will permit penetration by the stoma through such material for a wide range of sizes as compared with the prior practice of providing special karaya rings with preformed central openings of various sizes.

Referring now to the use of such sealing units: In its hermetically sealed condition the unit may be handled, shipped, stored, and applied to a drainage appliance without contamination of the sealing material and without distortion of the shape or size of such material. It can be applied universally to almost any drainage pouch. FIG. 12 shows it applied to the abdomen, without a drainage pouch. Just before such application the film sheet 32 will be cut away at its center by a sharp blade, scissors, or other cutting instrument, to provide a stoma-receiving opening 38 and preferably exposing the sealing material for contact with the patient's skin in a limited area around the stoma. The opposite film sheet 33 will be slit as indicated at 39 in FIG. 13 preferably by passing the cutting implement through the sealing material to allow for stoma discharge of the fecal matter into the pouch bag. When applying the appliance to the patient the stoma will be pressed through the relatively soft material and said material will be displaced but will snugly engage entirely around the stoma, making effective sealing engagement therewith. A single sealing unit will serve any of a wide range of stoma sizes and shapes because the unit has a full body of sealing material which will be spread or expanded from its central portion outwardly to accommodate any stoma from a smallest size to larger diameters within the maximum given diameter of the unit. Thus a sealing unit of my invention with a sealing material body for say a 2 inch stoma would serve for many smaller stoma sizes. This is a new result. Compared with the prior practice for example, in the present ostomy field one concern provides a measuring guide for separate ring seals having stoma openings of 11 sizes from ⅞ to 2 inches inside diameters; another concern provides 10 sizes from ½ to 1¾ inches inside diameters; another, 13 sizes from 11/16 to 2 inches inside diameters; another, 6 sizes from ½ to 1½ inches; another, 12 sizes from ½ to 2½ inches; and another, 19 sizes from ¼ to 1¾ inches.

Referring to FIGS. 13 and 14: These show the unit applied to the outer side of a conventional drainage pouch 42 which has a stoma-receiving opening 43 in its inner wall 44. The sealing unit with its pouch bag will be held in position on the patient by a belt 45 which encircles the patient's waist. The belt here shown is described in connection with FIGS. 17 and 18. It will be noted at this point that one of the advantageous functions of the sealing unit or receptacle of my invention is that it serves to confine the semi-liquid sealing material from oozing outwardly beyond the structure of said unit. This is illustrated in FIG. 14. Heretofore, after an appliance has been on a patient for several hours the discharge from the stoma will have seeped back around the stoma and contacted the sealing material. Inasmuch as most sealing materials absorb water or liquid from the discharge, the material softens and begins to slough off. With prior constructions the softening process reaches the outside circumference of the sealing means. And due to said softening and also to belt tension, a compression force is exerted on the sealing material causing it to ooze beyond its original outer circumference. This causes soiling of clothing and bedding. With my invention the sealing material is contained within the structure formed by the parts 31, 32 and 33 confined against such oozing action. Also, the sealing material is free to flow into the pouch bag as illustrated at 40 in FIG. 14. This condition occurs in a shorter period of time when the patient is in bed and lying on his back. The tendency then is for the discharge to collect around the stoma instead of flowing into the bottom of the pouch. With my invention as the sealing material softens and is free to flow away, the stoma protrudes farther into the pouch.

FIGS. 15 and 16 show the sealing unit applied to the inside of a conventional stick-on pouch bag 46. FIG. 16 illustrates application of this pouch assembly to the abdomen of a patient. This application is described more in detail in connection with FIGS. 17 and 18. For clarity it will be noted that a stick-on sheet 47 having adhesive on opposite sides is adhered at one side to the inner side wall 48 of the bag and is adhered on its opposite side to the abdomen around the stoma. Also it will be noted that the film sheet 32 of the unit above described is omitted and the film wall 48 of the bag constitutes one side of the mold unit. A belt is not needed because the assembly is held in position on the patient by the stick-on sheet 47.

In FIGS. 17, 18 and 19 the sealing unit is generally similar to that described in connection with FIG. 1 to 11, inclusive, except that here, one side 51 of the plastic bag 52 is used as the closure for one side of the gel mold in place of the film sheet 32. In this embodiment a disposable belt 50 is used as claimed in my application Ser. No. 43,676 filed June 5. 1970, and now U.S. Pat. No. 3,395,268, granted Oct. 3, 1972. This belt has ends 53 and 54 wrapped around the ring body 31 and terminating at 55 as shown in FIG. 19. The overlapping portions of each belt end are united by heat sealing at 56 and this also makes a heat seal bonding to the bag wall 51. The opposite side wall 57 of the bag is heat sealed to the side wall 51 along both side edges at 58 and at the top 59. The belt ends are thus heat sealed to and between the side walls 51 and 57 of the bag. The belt ends need not be wound about the ring body 31 and heat sealed as described but might otherwise be connected to the assembly. For example, in FIG. 19, the belt end 54 could be applied outside the bag beneath the bag sheet 51 and suitably united as by heat sealing or otherwise to the bag and the assembly. Before application of this bag to the patient, the center portion will be removed for entry of the stoma and to expose the sealing material for contact with the abdomen of the patient. At the time of cutting 61 the cutting blade will be passed through the soft gel for making slits such as 62 in the film sheet 33, thereby permitting the stoma to pass through the soft gel and enter the inside of the pouch bag for delivering fecal discharge thereto.

FIGS. 20, 21, 22 and 23 show application of the sealing unit to the open end of a drainage pouch bag 63. Here, a unit such as shown in FIG. 10 has a groove 64 formed continuously around the periphery of the ring body 31. The entire open end portion 65 of the bag is pressed into the groove 64 and a suitable tying means such as a twist wire or a strong rubber band is applied in the groove over the end portion 65 of the bag. This tying means is here shown in the form of a twist wire member 66 which also serves for attachment of belt ends 67. As shown in FIG. 23 each belt end is wrapped around the wire member 66 and heat sealed at 68 to the belt proper. The ends 69 of the wire member will be drawn tight and twisted one with the other to tighten the wire member in the groove and thus securely connect the bag to the sealing unit and the belt to the assembly. In FIG. 20 the bag 63 is shown extended full length outwardly from the abdomen and the belt holds the assembly on the abdomen. In FIG. 21 the bag 63 is shown in its normal hanging position.

The embodiments herein described are of simple and novel construction and capable of manufacture at low cost. This makes for economy to the user and is advantageous in that the entire appliance may be disposed of after a single use.

It is believed the foregoing disclosure supports the objects prefaced above. It will be expressly understood that the drawings are diagramatic for purpose of illustrating the principles of my invention. And it will be evident to those skilled in this art that in the actual manufacture of the units and appliances of my invention, changes may be made in details of construction and materials within the spirit and scope of the invention set forth in the appended claims.

I claim:

1. An appliance for ostomy conditions and the like comprising a drainage pouch bag having spaced film walls, and a skin sealing means located within the pouch bag, said means comprising a hermetically sealed receptacle containing a skin sealing material, said receptacle having spaced film walls one of which is formed by one of the film walls of the pouch bag, the pouch bag wall of the receptacle adapted to be opened to provide an opening for admission of a stoma into the sealing material within the receptacle, the other film wall of the receptacle adapted to be opened to the stoma for its discharge of fecal matter into the pouch bag.

2. Sealing means for ostomy conditions and the like, comprising a hermetically sealed receptacle filled with a skin sealing material, the receptacle enclosing a full body of said material to accomodate passage therein of a given maximum diameter stoma and having opposed walls confining said material, one of said walls adapted to be opened at its center portion for admission of a stoma into the body of said material, the opposite wall adapted to be opened to the stoma for discharge of fecal matter from a patient, whereby the sealing means can be applied to a variety of stoma sizes from a small stoma to larger stomas up to the given maximum diameter by reason of the fullness of the body of sealing material within the receptacle.

3. Skin sealing means for ostomy conditions and the like, comprising a ring body forming the peripheral wall of a mold, a film sheet applied to each of the opposite sides of the ring body, a skin sealing material filling the enclosure formed by said peripheral wall and the film sheets, one of said film sheets adapted to have its center portion removed to provide a stoma-receiving opening, the opposite film wall adapted to be opened to allow for discharge of the fecal matter from a patient, whereby when the sealing means is applied to a patient the stoma will be passed through the central body of the sealing material with said material engaging in sealing contact entirely around the stoma.

4. Sealing means as set forth in claim 3, in which the filling of sealing material into said enclosure provides a full body of sealing material, and in which the ring body has a given maximum diameter and the ring body together with the film sheets confine said full body of material, whereby the sealing means can serve for application to a range of different stoma sizes and shapes from a minimum size stoma to larger size stomas within said maximum diameter of the ring body, and whereby the full body of said material allows displacement thereof to accommodate any of the different size stomas with the sealing material in sealing contact entirely around the stoma.

5. A disposable appliance for use in ostomy conditions and the like, comprising a mold structure having skin sealing material of soft and pliable consistency hermetically sealed therein, the mold structure adapted to be opened to permit penetration of a patient's stoma into said skin sealing material and for discharge of fecal matter from the stoma, and a belt having ends connected to the mold structure adapted to encircle the waist of the patient for holding the mold structure in position thereon, the mold structure and the belt comprising an assembly adapted for disposal after a single use.

6. A disposable appliance for ostomy conditions and the like, comprising a dainage pouch bag, skin sealing means of soft and pliable consistency, and a belt, the sealing means comprising a receptacle having said skin sealing material heremetically sealed therein, the receptacle adapted for reception of a stoma when in use on a patient with said sealing material in sealing engagement with the stoma, the receptacle and the drainage pouch bag being associated so that in such use the stoma discharges into the drainage pouch bag, the belt having ends connected to the receptacle adapted for holding the appliance in position on the patient, the drainage pouch bag, the skin sealing means, and the belt constituting a unit of assembly adapted for disposal after a single use.

7. An appliance for ostomy conditions and the like, comprising in combination with a drainage pouch bag having a stoma receiving opening, of a receptacle having opposite walls, and filled with a skin sealing material, the receptacle being hermetically sealed whereby to preserve the skin sealing material in air-tight condition, one side wall of the receptacle adapted to be opened to provide a stoma-receiving opening, the receptacle and the drainage pouch being associated with the stoma-receiving opening of the receptacle in registration with the stoma-receiving opening of the drainage pouch, the opposite wall of the receptacle adapted to be opened to provide an opening for the stoma to discharge fecal matter into the drainage pouch, whereby application of the appliance to a patient will cause the stoma to penetrate the sealing material in the receptacle in sealing engagement entirely around the stoma and will position the stoma for said discharge.

8. An appliance for ostomy conditions and the like, comprising a drainage pouch bag and sealing structure in cooperative relation, the sealing structure enclosing and hermetically sealing a substantially flat body of skin sealing material, the sealing structure having on each opposite side a film sheet, the film sheet on the side adjacent to the abdomen of a patient when the appliance is to be applied in use adapted to be opened at its center to provide an opening for reception of the patient's stoma and for exposing the skin sealing material for contact with an area of the patient's skin around the stoma, and the film sheet on the opposite side adapted to be opened to provide an opening for the stoma to discharge the fecal matter into the drainage pouch bag, the sealing structure serving to confine the skin sealing material from oozing outwardly beyond the structure of said abdomen side and permitting free flow of said material from around the discharge end of the stoma into the drainage pouch bag when the appliance is in use.

9. A sealing unit for ostomy conditions comprising a ring shaped container, a body of skin sealing material within and fully filling said container, said material being of soft and pliable consistency when placed in said container, the container having a thin film sheet at each side whereby to hermetically seal said sealing material within the container and whereby said material is maintained in said soft and pliable consistency until the time for the application of the sealing unit to a patient, in combination with a drainage pouch having opposite film sheet walls, in which one film sheet wall of the drainage pouch constitutes one of the film sheets of the container.

* * * * *